United States Patent Office.

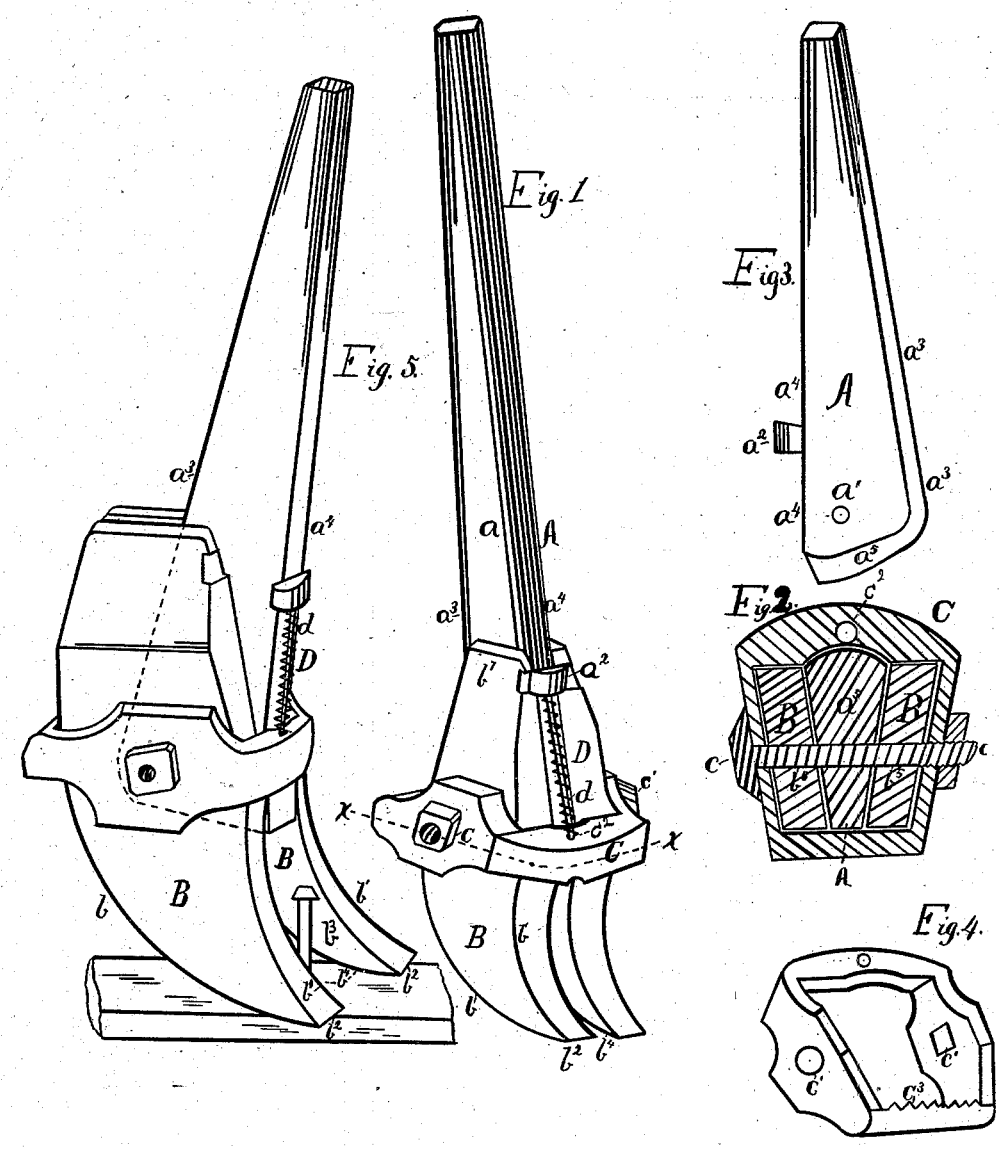

WILLIAM H. LYMAN, OF SPRINGFIELD, MISSOURI.

CLAW-BAR.

SPECIFICATION forming part of Letters Patent No. 295,571, dated March 25, 1884.

Application filed February 13, 1884. (No model.)

*To all whom it may concern:*

Be it known that I, WILLIAM H. LYMAN, a citizen of the United States, residing at Springfield, in the county of Greene and State of Missouri, have invented certain new and useful Improvements in Claw-Bars, of which the following is a specification, reference being had therein to the accompanying drawings.

My invention relates to improvements in claw-bars having movable claws, the object of which is to provide a certain, easy, convenient, and rapid means for drawing or removing bolts, spikes, nails, &c. These objects I attain by means of the device illustrated in the accompanying drawings, forming a part of this specification, in which—

Figure 1 is a view in elevation, showing the entire device. Fig. 2 is a sectional view on the line $x\ x$ of Fig. 1. Figs. 3 and 4 are detailed views. Fig. 5 is a view showing the device with the claws spread to receive a bolt.

A represents a bar or lever made of any suitable material, preferably steel, and of any desired length and size. The upper end of the bar may be made in any convenient shape. The lower part has the sides made tapering, or narrows from above, $a^4$, to a narrower lower edge, $a^3$, forming a wedge-shape section, as shown at $a^5$, Fig. 2. Through the lower part of the said bar is a hole, $a'$, to receive a connecting-bolt, $c$, and a lug, $a^2$, or suitable device, to serve as a support or stay to the back part of the spring D and claws B.

B B represent toes or claws made any desired width, preferably of equal width with the lower part of the bar, and of any desired thickness and convenient length. The upper side, $b'$, is preferably made concave, the lower, $b$, convex and coming to a point, $b^2$. These points may be made turning outward to receive a thicker bolt. The lower inner edges of these claws may be toothed, rounded, or beveled, but are preferably made sharp, $b^4$, and the lower inner sides, $b^3$, concave, the better to clasp and hold the bolt or spike when it projects but a little and has no head. $b^5$ are holes for a connecting-bolt.

C represents a collar or yoke made in any convenient shape to encircle the bar and claws, and has holes $c'$ to receive the connecting-bolt $c$, said bolt serving as a support to and bearings for the bar and claws to move upon. In the upper side is a hole, $c^2$, to receive the front end of a guide, $d$, for a spiral spring.

D is a spring placed between the lug $a^2$ and the upper part of the collar, to keep the said collar forward, and thus hold the claws level. The said spring is preferably a spiral spring placed on a guide-rod, $d$, which is attached to the lug or bar at the back end, the front end being free to play in a hole, $c^2$, through the collar. The lower part of the collar may be made of any desired shape and size to serve as a fulcrum for the bar, but is preferably made heavy and with a toothed front lower edge, $c^3$, as shown.

The device is operated thus: The claws being placed on the sides of the bar, and the collar around them, the whole are secured in place by a bolt, $c$. The bar being placed upon the points of the claws, the pressure forces the spring together, and the back part of the claws drops to a narrow part of the bar, while the front part is forced open by the wide part of the bar, which is pressed down between them, as shown in Fig. 5. The claws are then slipped straddle of the bolt, spike, or other thing to be pulled. The lever or bar is then moved backward, which forces the broader part $b^3$ down between the back part of the claws, and raises the thicker front end from between the front part of the claws, the bar turning upon the bolt $c$, and thus the claws are given a lateral motion, which takes place before the vertical motion begins, and causes the claws to firmly clasp the bolt, &c., to be drawn. The lateral pressure of the claws is sustained by the yoke C, which is made strong and strengthened by the connecting-bolt $c$. Thus spikes, bolts, &c., without heads may be easily drawn, as the claws will clasp it so tightly as to form a hold to pull by; and when the front ends of the claws are made sharp, as above described, they will clasp a bolt that projects in the least and cut in the sides sufficient to hold the same while being drawn; and in this construction, which produces a lateral and perpendicular motion of the claws, is one of the great advantages of my device. The lateral motion of the claws is stopped when their back ends strike the lug e. They are then forced upward, by the leverage, over a fulcrum formed by the lower convex part of the same, and also by the lower part of the yoke, which may be made in any desired shape for this purpose. When the spike, bolt, &c., is raised, so that the lever or bar touches the ground, the lever is raised, the claws forced open to take a new hold, and this may be repeated any number of times until the bolt is drawn.

All parts of the device being detachable, any one part may be easily replaced when worn or broken, and different-shaped claws may be used with the same yoke and bar, when desired.

Having thus described the construction, use, and operation of my invention, what I claim as new, and desire to secure by Letters Patent, is—

1. An improved claw-bar, composed of a lever, A, having a wedge shaped lower end, to which are attached movable claws B by means of a yoke or collar, C, and a connecting-bolt, c, said yoke being held forward by a spring, D, all substantially as shown and described.

2. A lever for a claw-bar, having its lower end made wedge shape, through which is a hole, $a'$, to receive a connecting-bolt, and above which is a lug, $a^2$, or other equivalent device for supporting the back end of attached claws, all substantially as shown and described, for the purpose set forth.

3. The combination of movable claws B, attached to the lower end of a lever by means of a collar, C, and bolt c, with a spring, D, supported on a guide-rod, d, said rod having a free end playing in a hole, $c^2$, of the collar, all substantially as and for the purpose specified.

In testimony whereof I affix my signature in presence of two witnesses.

WILLIAM H. LYMAN.

Witnesses:
SEWARD A. HASELTINE,
J. T. WHITE.